(12) United States Patent
Landschoot et al.

(10) Patent No.: US 7,174,616 B2
(45) Date of Patent: Feb. 13, 2007

(54) HANDLING THE ROTOR OF A ROTARY MACHINE

(75) Inventors: Georges Landschoot, Brugge (BE); Rik Vackier, Veldegem (BE)

(73) Assignee: CNH America LLC, Racine, WI (US)

( * ) Notice: Subject to any disclaimer, the term of this patent is extended or adjusted under 35 U.S.C. 154(b) by 231 days.

(21) Appl. No.: 10/855,663

(22) Filed: May 27, 2004

(65) Prior Publication Data

US 2004/0248629 A1 Dec. 9, 2004

(30) Foreign Application Priority Data

Jul. 7, 2003 (GB) .................................. 0313177.8

(51) Int. Cl.
*B23P 19/00* (2006.01)
*B21D 53/60* (2006.01)
*A01F 7/00* (2006.01)

(52) U.S. Cl. ...................... 29/426.5; 29/426.1; 29/891; 460/149

(58) Field of Classification Search ................ 29/426.1, 29/426.5, 891; 460/149
See application file for complete search history.

(56) References Cited

U.S. PATENT DOCUMENTS 1,923,126 A * 8/1933 Tucker ......................... 290/52

4,177,701 A * 12/1979 Schulz ......................... 82/164
5,499,948 A 3/1996 Underwood
6,171,730 B1 1/2001 Kuroda et al. ................. 430/5

FOREIGN PATENT DOCUMENTS

GB 2385505 A 8/2003

OTHER PUBLICATIONS

Bomzon et al., Applied Physics Letters, Sep. 10, 2001, vol. 79, No. 11, pp. 1587-1589.

* cited by examiner

*Primary Examiner*—John C. Hong
(74) *Attorney, Agent, or Firm*—Rebecca Henkel

(57) ABSTRACT

A method and apparatus are disclosed for removing a rotor of a rotary machine, such as a rotary combine harvester. The method comprises the steps of exposing one end of the rotor while ensuring that the rotor remains safely anchored within the machine, securing to the exposed end of the rotor a plate that is mounted on a support block carried on the lifting platform of a movable lifting device, disconnecting the rotor from all remaining components of the machine to permit the rotor to be slid out of the machine, and moving the lifting device away from the machine while simultaneously controlling the height of its lifting platform to cause the end of the rotor to move along a path parallel to the axis of the rotor and thereby extract the rotor from the machine while supporting the weight of the portion of the rotor projecting from the machine.

8 Claims, 4 Drawing Sheets

HANDLING THE ROTOR OF A ROTARY MACHINE

FIELD OF THE INVENTION

The present invention relates to method and apparatus for handling the rotor of a rotary machine, in particular a rotary combine harvester.

BACKGROUND OF THE INVENTION

Rotary combine harvesters have either one rotor or two counter-rotating rotors that extend lengthways parallel to one another. They are inclined to the horizontal, their front ends being mounted lower than their rear ends. The manner in which the rotors function is itself well known and it will not be described herein, more particularly as it is not relevant to the invention. Within the present context, it suffices to know that the rotors are large and heavy and that from time to time they need to be removed for servicing and repair.

Removal of the rotor(s) of a combine harvester (and its subsequent replacement) is a labour intensive task requiring several men on account of the size and weight of the rotor. Its size also makes it difficult to support and maneuver the rotor while repairs are being carried out on it. A particular problem presented by the rotor of a rotary combine harvester is that its axis is inclined and there is a risk of damage to the machine and personal injury, if once it has been freed, the rotor slides under gravity out of the machine.

OBJECT OF THE INVENTION

The object of the present invention is therefore to simplify the tasks of removal, repair and replacement of the rotor of a large rotary machine.

SUMMARY OF THE INVENTION

According to a first aspect of the invention, there is provided a method of removing a rotor of a rotary machine, such as a rotary combine harvester, which comprises the steps of: exposing one end of the rotor while ensuring that the rotor remains safely anchored within the machine, securing to the exposed end of the rotor a plate that is mounted on a support block carried on the lifting platform of a movable lifting device, disconnecting the rotor from all remaining components of the machine to permit the rotor to be slid out of the machine, and moving the lifting device away from the machine while simultaneously controlling the height of its lifting platform to cause the end of the rotor to move along a path parallel to the axis of the rotor and thereby extract the rotor from the machine while supporting the weight of the portion of the rotor projecting from the machine.

In the invention, the number of people needed to remove and later replace a rotor is reduced because the weight is supported not by men but by the lifting device. The lifting device is preferably a forklift truck, this being a lifting device that farmers will normally have at their disposal.

As the rear end of the rotor comes away from the machine, unless the weight of the rotor is supported elsewhere, excessive torque would act on the plate and the means used to anchor the plate to the rotor.

It is therefore preferred to attach an extension arm to the support block to support the weight of the rotor at a distance from the plate as the rotor is extracted from the machine in order to reduce the moment of the rotor about the plate.

The support block and its extension arm provide a suitable frame on which the rotor can rest while it is being serviced or repaired. The same support block can of course also be used to replace the rotor, this time the truck being driven forward at the same time as its fork is raised.

During the replacement of the rotor, it is important to be able to rotate it to time the phase of its rotation correctly in relation to other components (such as the other rotor, if twin rotors are provided). It is therefore preferred to mount the plate rotatably on the support block and to rotate the rotor about its own axis when in the machine.

According to a second aspect of the invention, there is provided an apparatus for removing a rotor of a rotary machine, such as a rotary combine harvester, comprising a support block having a base designed to be anchored to the lifting platform of a movable lifting device, a plate mounted on the support block and anchoring points on the plate for enable the plate to be firmly secured to one end of the rotor.

Preferably, the base comprises two hollow girders dimensioned and positioned to receive the prongs of the lifting platform of a movable lifting device.

Though the apparatus and method of the invention can be used with a wide variety of rotary machines, such as turbines, they have particular application to rotary combine harvesters, where a rotor is inclined to the horizontal. In such an application, it is advantageous for the plane of the plate to be inclined to the plane of the two girders so that the normal to the plate, which extends parallel to the axis of the rotor, is inclined to the horizontal when the support block is carried by a horizontal lifting fork.

To permit angular positioning, the plate is preferably rotatable relative to the support block. This can conveniently be achieved by mounting the plate on a shaft that is journalled on the support block by means of at least two pillar blocks.

In the preferred embodiment of the invention, an extension arm for the support block is further provided for supporting the weight of the rotor at a point along its length spaced from the plate.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
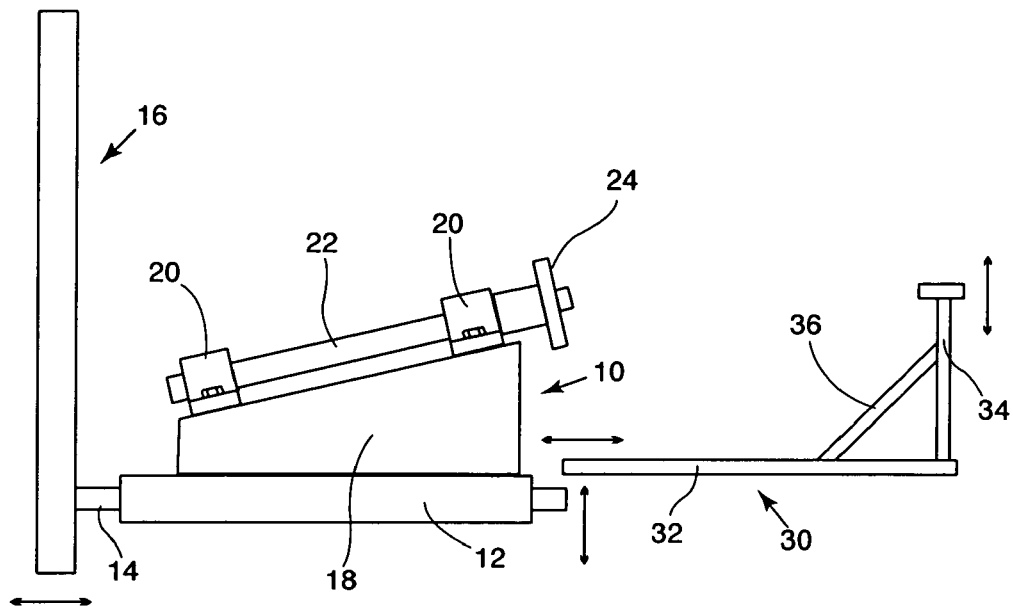
FIG. 1 is a schematic side view of a support block and an extension arm for use in extracting the rotor of a rotary combine harvester.
Figure 2:
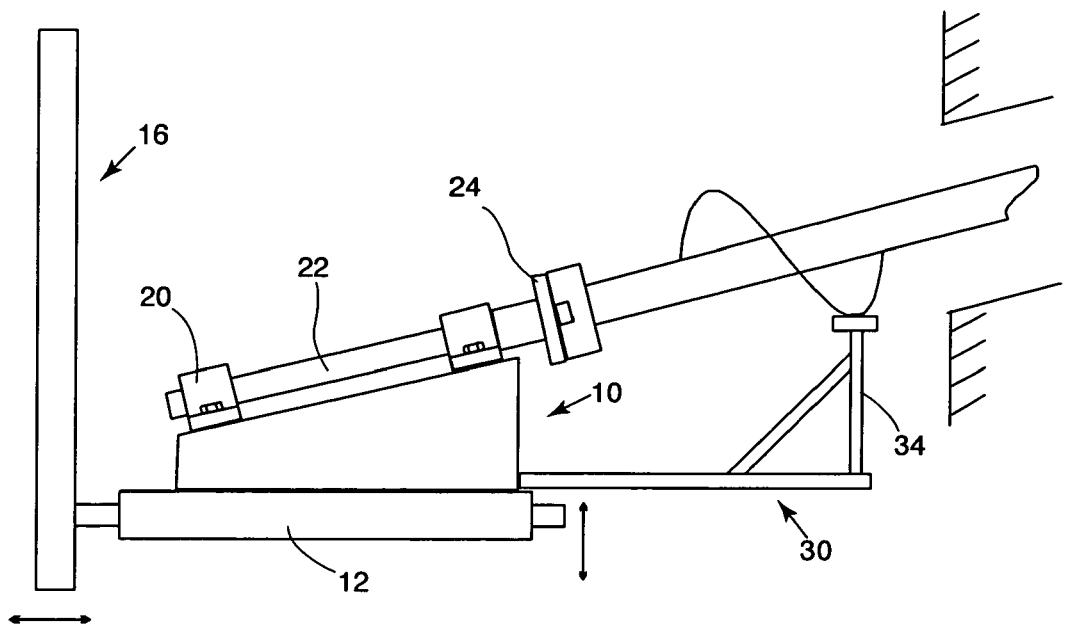
FIG. 2 is a side view of a support block and extension arm when in use.
Figure 3:
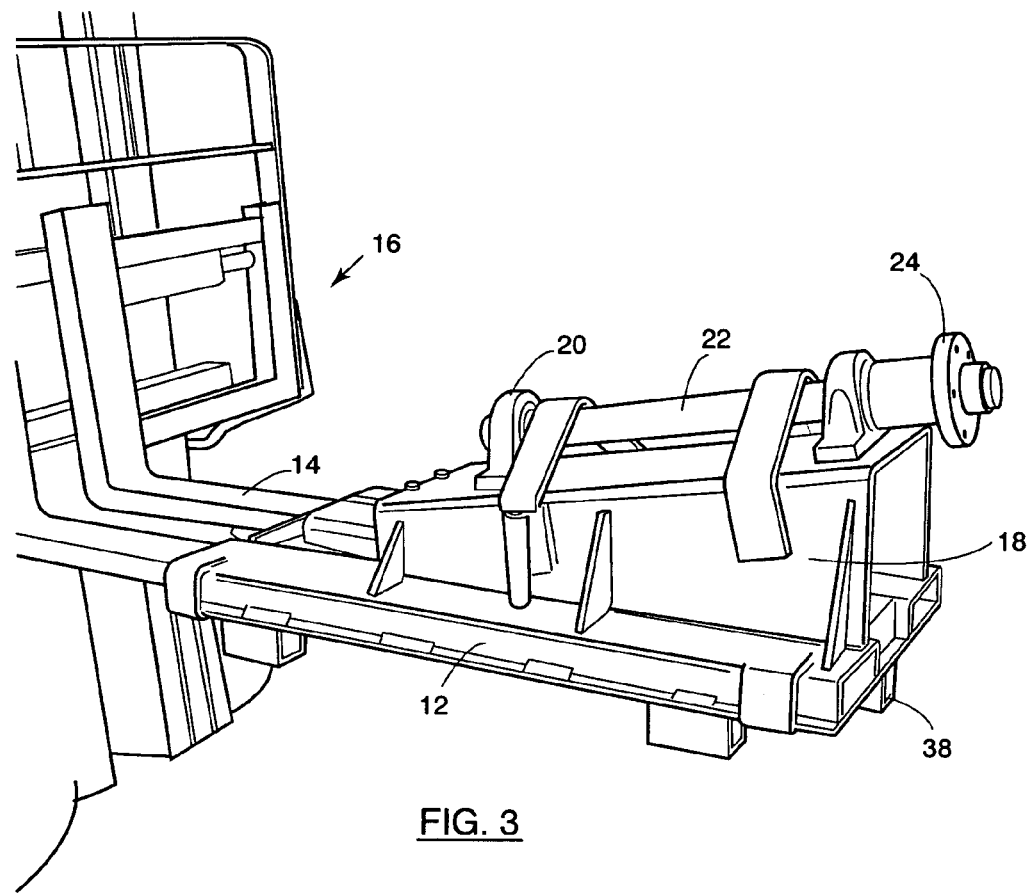
FIG. 3 is a perspective view of the support block of FIGS. 1 and 2.

Referring to FIGS. 1 and 3, a support block 10 for withdrawing a rotor from a combine harvester comprises a pair of hollow girders 12 which are dimensioned and spaced apart to receive the prongs 14 of a fork lift truck 16. A tunnel 18 of tapering height is welded to the top surfaces of the two girders 12 and its top surface carries two pillow blocks 20 within which there is journalled a shaft 22. The front end of the shaft 22 is provided with a plate 24 having holes that enable it to be bolted to the front face of a rotor of a combine harvester.

Figure 4:
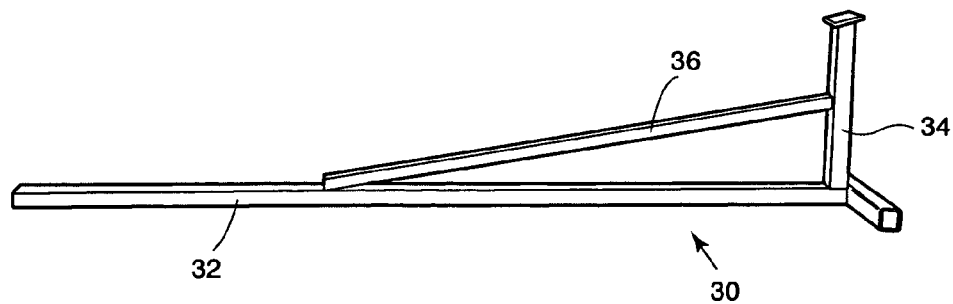
FIG. 4 is a side view of an extension arm similar to that shown in FIGS. 1 and 2.
Figure 5:
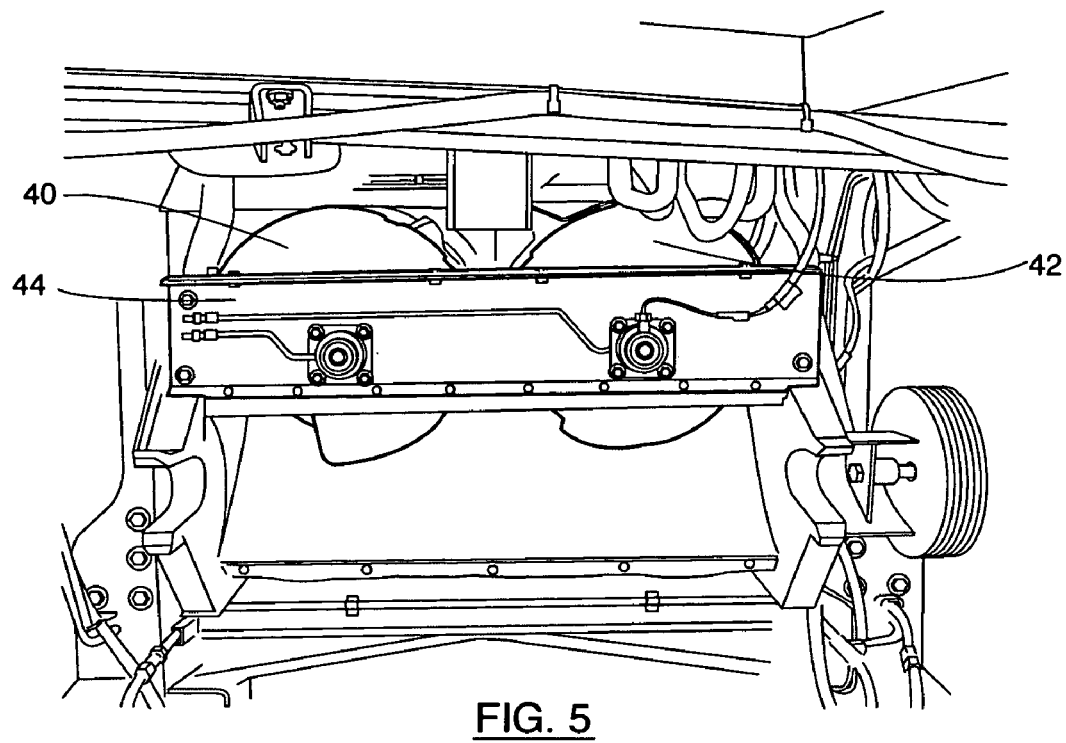
FIG. 5 shows the front end of the rotors of a combine harvester before removal of a cross member on which their front ends are supported, FIG. 6 shown the front end of the rotors of the combine harvester in FIG. 5 after removal of the cross member and connection of the support block of FIG. 3 to the exposed end of one of the two counter-rotating rotors.

As shown in FIGS. 1 and 4, the support block also has an extension arm 30 that can be inserted into a hole 38 formed on the underside of the support block 10. The extension arm 30 has a horizontal limb 32, a telescopic vertical limb 34 and a brace 36. Various locking pins are used to prevent the support block from moving on the prongs 14 of the fork lift truck 16, to lock the horizontal limb 32 of the extension arm 30 relative to the support block 10 and to prevent collapse of the telescopic vertical limb 34.

A rotary combine harvester may have one or two rotors but the one shown in FIGS. 5 to 8 has two counter rotating rotors 40,42. These rotors are inclined relative to the horizontal when the harvester is standing on level ground. The front ends of the rotors 40, 42 are journalled on a cross member 44 which needs to be removed before either of the rotors can be withdrawn. However, there is a risk of the rotors sliding out of the combine harvester once the cross member is removed and the first step taken is therefore to secure the two rotors in position. The manner in which this is done will depend on the harvester but as an example it is possible to insert a bar through holes in a grill plate that underlies the rotors.

Figure 6:
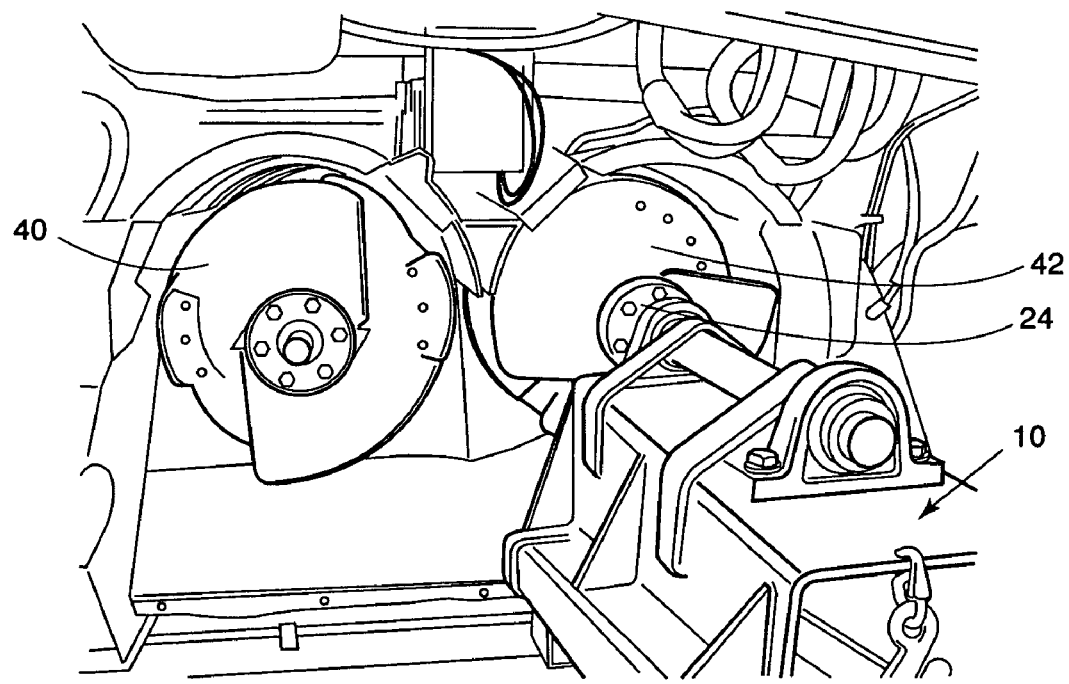

Having secured the rotors 40 and 42 so that their weight is not entirely resting on the cross member 44, the latter member is removed to expose the front ends of both rotors as shown in FIG. 6.

The plate 24 of the support block 10 is now offered up to the exposed end of the rotor to be removed and it is bolted on to the front end of the rotor. The positioning of the plate 24 into alignment with the end of the rotor is carried out by raising or lowering the support block using the fork lift truck and driving the truck forwards or backwards, as necessary. If necessary, the shaft 22 can be rotated by hand to ensure that holes in the plate 24 line up with holes in the end of the rotor.

After the plate 24 has been bolted to the front end of the rotor, it is safe to remove whatever obstacle remains to the sliding of the rotor out of the combine harvester. Thus if a bar has been jammed between part of the rotor and the machine, that bar may now safely be removed as the weight of the rotor is taken up by the fork lift truck and the support block 10.

Figure 7:
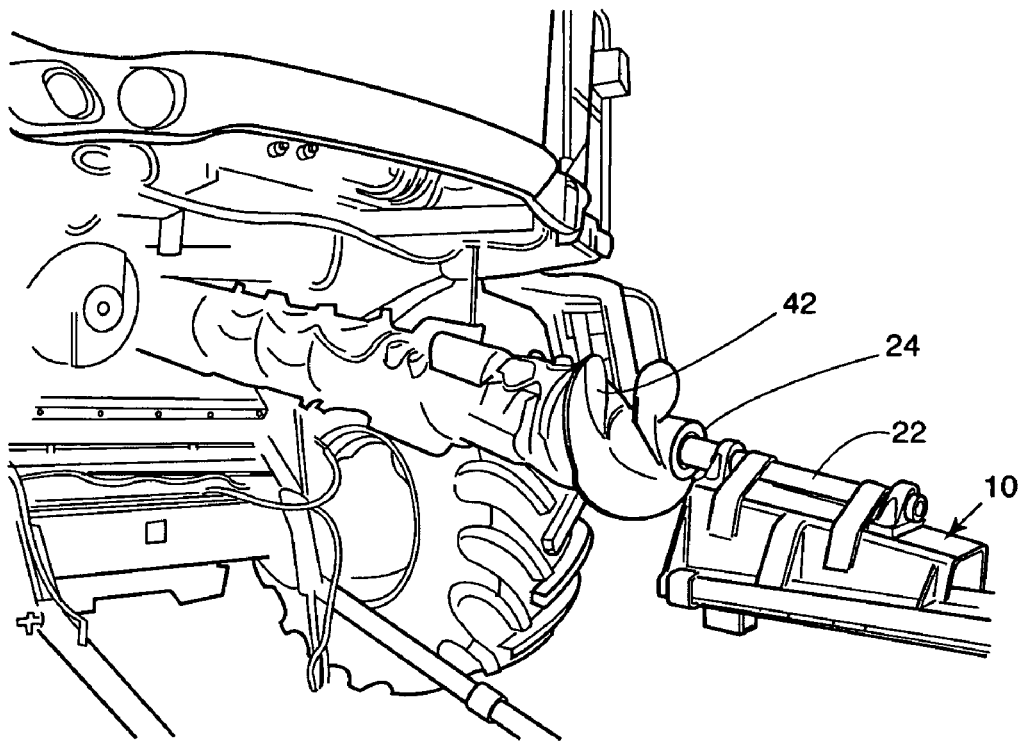
FIG. 7 is a side view after partial withdrawal of the rotor.

To slide the rotor out of the harvester, as shown in FIG. 7, the driver reverses the fork lift truck and lowers its fork at the same time so that the plate 24 moves parallel to the axis of the rotor. While the upper end of the rotor remains inside the harvester, it is safely supported at two points. However it is not safe to pull the rotor entirely out of the harvester when only supported by the plate 24, because the torque applied by the weight of the rotor could damage the shaft 22 or the rotor itself.

For this reason, after the rotor has been partly withdrawn from the machine, the extension arm 30 is added to the support block 10 to take the weight of the rotor at a point along its length.

Figure 8:
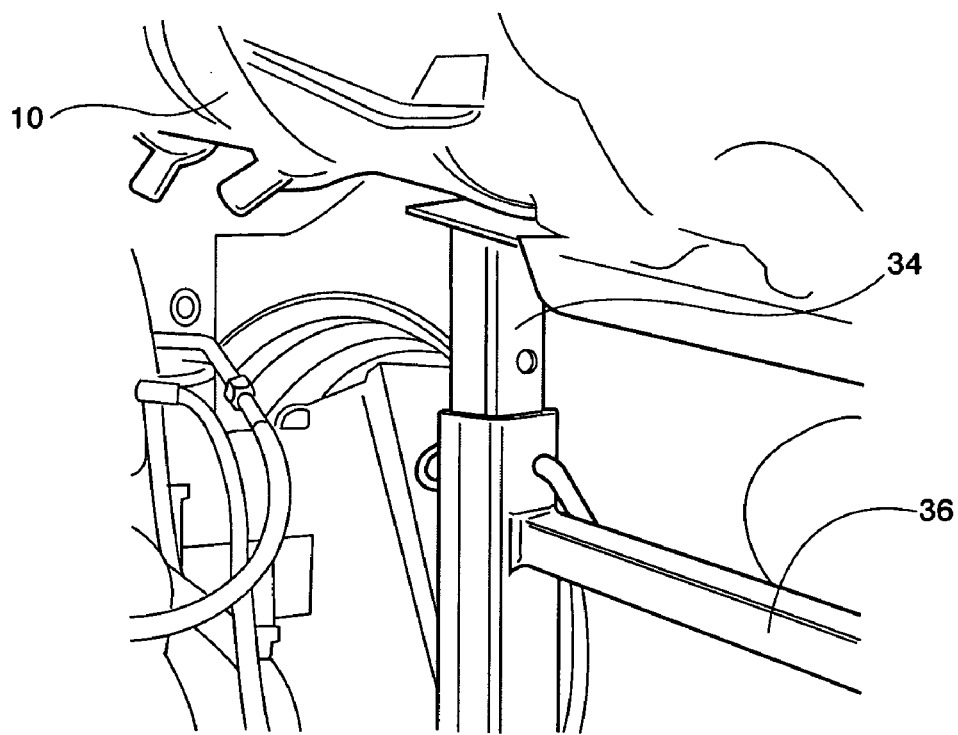
FIG. 8 shows a detail of the rotor supported along its length on the extension arm of FIG. 4 to facilitate its full withdrawal from the combine harvester.

After the horizontal limb 32 has been slotted into its hole 38 in the support block, its telescopic vertical limb 34 is raised to until it contacts the rotor and then locked in position as shown in FIG. 8. The reversing of the truck and simultaneous lowering of the fork can now be continued until the entire rotor lies outside the harvester.

The support block 10 can now be rested on the ground and the prongs of the fork lift truck can be withdrawn. Any necessary work can be carried out on the rotor while it is supported in this manner and it can be rotated as desired to work on it its different parts.

Replacement of the rotor is carried out in essentially the reverse order. The upper end of the rotor is first introduced into the harvester, after its partial insertion, the extension arm is removed, next it is driven to its end position and locked in position. During these steps, the rotor can be rotated about its own axis for correct angular alignment with the other rotor or other machine components. After separation of the plate 24 from the exposed end of the rotor, the cross member 44 can be replaced and the rotor is then freed for normal operation by removal of any locking bar used to hold it in place after its unbolting from the support block 10.

The invention claimed is:

1. A method of removing a rotor of a rotary machine characterized in that it comprises the steps of:
  a exposing one end of the rotor while ensuring that the rotor remains safely anchored within the machine,
  securing to the exposed end of the rotor a plate that is mounted on a support block carried on the lifting platform of a movable lifting device,
  disconnecting the rotor from all remaining components of the machine to permit the rotor to be slid out of the machine, and
  moving the lifting device away from the machine while simultaneously controlling the height of its lifting platform to cause the end of the rotor to move along a path parallel to the axis of the rotor and thereby extract the rotor from the machine while supporting the weight of the portion of the rotor projecting from the machine.

2. A method as claimed in claim 1, characterized in that a forklift truck is used as the movable lifting device.

3. A method as claimed in claim 2, characterized in that it comprises attaching an extension arm to the support block to support the weight of the rotor at a distance from the plate as the rotor is extracted from the machine in order to reduce the moment of the rotor about the plate.

4. A method as claimed in claim 3, characterized in that it comprises the additional step of mounting the plate on the support block in a manner to permit the plate to rotate and rotating the rotor about its own axis as it is retracted from the machine.

5. A method as claimed in claim 2, characterized in that it comprises the additional step of mounting the plate on the support block in a manner to permit the plate to rotate and rotating the rotor about its own axis as it is retracted from the machine.

6. A method as claimed in claim 1, characterized in that it comprises attaching an extension arm to the support block to support the weight of the rotor at a distance from the plate as the rotor is extracted from the machine in order to reduce the moment of the rotor about the plate.

7. A method as claimed in claim 6, characterized in that it comprises the additional step of mounting the plate on the support block in a manner to permit the plate to rotate and rotating the rotor about its own axis as it is retracted from the machine.

8. A method as claimed in claim 1, characterized in that it comprises the additional step of mounting the plate on the support block in a manner to permit the plate to rotate and rotating the rotor about its own axis as it is retracted from the machine.

* * * * *